United States Patent
Buchmueller et al.

(10) Patent No.: US 9,467,922 B1
(45) Date of Patent: Oct. 11, 2016

(54) CELLULAR CONNECTIONS BETWEEN USER EQUIPMENT AND WIRELESS STATIONS BASED ON USER EQUIPMENT LOCATION AND WIRELESS STATION LOCATIONS

(71) Applicant: Amazon Technologies, Inc., Seattle, WA (US)

(72) Inventors: Daniel Buchmueller, Seattle, WA (US); Fabian Hensel, Seattle, WA (US); Gur Kimchi, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/740,105

(22) Filed: Jun. 15, 2015

(51) Int. Cl.
| | |
|---|---|
| *H04W 36/30* | (2009.01) |
| *H04W 16/18* | (2009.01) |
| *H04B 7/185* | (2006.01) |
| *H04W 36/00* | (2009.01) |
| *H04W 36/32* | (2009.01) |
| *H04W 64/00* | (2009.01) |

(52) U.S. Cl.
CPC ......... *H04W 36/30* (2013.01); *H04B 7/18506* (2013.01); *H04W 16/18* (2013.01); *H04W 36/0094* (2013.01); *H04W 36/32* (2013.01); *H04W 64/006* (2013.01)

(58) Field of Classification Search
CPC ... H04W 36/14; H04W 36/30; H04W 36/32; H04W 36/18; H04W 36/0016; H04W 36/0083; H04W 24/04; H04W 64/00; H04W 48/16; H04W 36/08; H04W 84/045; H04W 36/0061; H04W 52/283; H04W 16/20; H04W 36/0022; H04W 48/08; H04W 76/028; H04W 88/08; H04W 36/00; H04W 36/0044; H04W 36/0055; H04W 36/0066; H04W 36/26; H04W 40/20; H04W 48/20; H04W 4/026; H04W 64/006; H04W 16/18; G01S 5/00; H04B 17/27; H04B 7/18541
See application file for complete search history.

(56) References Cited

U.S. PATENT DOCUMENTS

| | | | | |
|---|---|---|---|---|
| 2002/0082036 | A1* | 6/2002 | Ida | H04W 52/283 455/522 |
| 2009/0168722 | A1* | 7/2009 | Saifullah | H04W 36/0033 370/331 |
| 2009/0318151 | A1* | 12/2009 | Jung | H04W 36/32 455/436 |

(Continued)

*Primary Examiner* — Nizar Sivji
(74) *Attorney, Agent, or Firm* — Athorus, PLLC

(57) ABSTRACT

Described are systems and methods for considering a user equipment (UE) location and Evolved Node B (eNodeBs) locations as a factor in determining whether a handoff of a wireless connection between the UE and a first eNodeB to a second eNodeB should be initiated. Alternatively, the systems and methods include selection of an eNodeB with which a wireless connection is to be established. In addition to considering a signal strength for an eNodeB and determining whether to established a wireless communication or initiate a handoff based on the signal strength, the UE location and eNodeB locations may likewise considered. Likewise, a navigation path or anticipated trajectory of the UE may also be considered when selecting an eNodeB with which a wireless communication is to be established or to which a handoff of an existing wireless communication is to be initiated.

14 Claims, 5 Drawing Sheets

(56) References Cited

U.S. PATENT DOCUMENTS

| | | | | |
|---|---|---|---|---|
| 2010/0248722 A1* | 9/2010 | Van Bussel | ....... | H04W 36/0061 455/436 |
| 2010/0273488 A1* | 10/2010 | Kim | ...................... | H04W 24/10 455/436 |
| 2014/0171088 A1* | 6/2014 | Edara | ................... | H04W 36/32 455/440 |
| 2015/0036663 A1* | 2/2015 | Kilpatrick, II | .... | H04W 36/0083 370/332 |
| 2015/0208353 A1* | 7/2015 | Jung | ................. | H04W 52/0254 455/456.6 |
| 2015/0236778 A1* | 8/2015 | Jalali | ..................... | H04W 84/06 370/316 |
| 2016/0037470 A1* | 2/2016 | Bartlett | ............... | H04W 60/005 455/435.2 |

* cited by examiner

CELLULAR CONNECTIONS BETWEEN USER EQUIPMENT AND WIRELESS STATIONS BASED ON USER EQUIPMENT LOCATION AND WIRELESS STATION LOCATIONS

BACKGROUND

Cellular networks have become widespread and provide coverage to most populated areas. The cellular networks typically include an Evolved Node B (eNodeB) located at different areas that include cellular radios and antennas configured to establish wireless connections with user equipment (UE), such as cellular phones, laptops, etc. Typically, the antennas of the eNodeB are positioned at a height above ground (e.g., 60 ft.-200 ft.) and oriented to provide coverage to users located on the ground and/or in buildings. The placement of eNodeBs is somewhat dependent on the surrounding terrain, obstacles, desired coverage area, desired quality of service, capacity, and/or other factors. As such, the locations of eNodeBs are typically not in an arranged or grid like pattern and the cellular network provider often does not share eNodeB location information.

Based on the cellular network design, connection between an eNodeB and a UE may be established and/or maintained in different manners. Likewise, a handoff or handover of a wireless connection between a UE and a first eNodeB to a second eNodeB may be managed using a variety of techniques. For example, some cellular networks utilize a UE controlled handoff in which the UE utilizes measured signal strength for different eNodeBs and makes a determination based on the signal strength values whether a handoff from an eNodeB to which the UE is currently connected to another eNodeB is to be initiated. In other configurations, a UE assisted handoff may be utilized. In a UE assisted handoff, the UE provides the signal strengths for the different eNodeBs to the wireless network provider. The wireless network provider then determines, based on those signal strengths, whether a handoff is to be initiated.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

Figure 1:
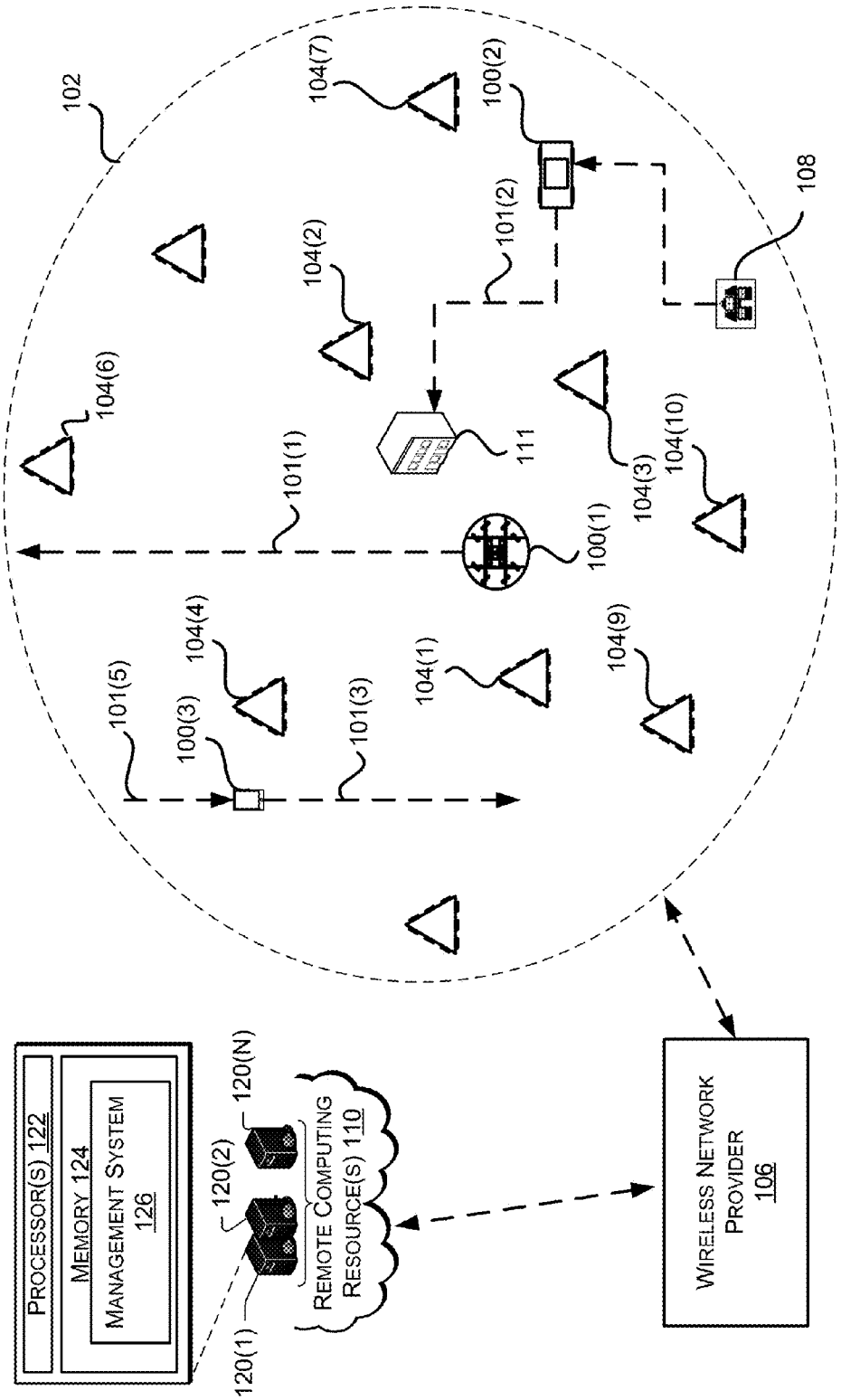
FIG. 1 is a diagram illustrating an environment utilizing user equipment locations as a factor in cellular connections and/or cellular handoffs, according to an implementation.

While implementations are described herein by way of example, those skilled in the art will recognize that the implementations are not limited to the examples or drawings described. It should be understood that the drawings and detailed description thereto are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean "including, but not limited to." Additionally, as used herein, the term "coupled" may refer to two or more components connected together, whether that connection is permanent (e.g., welded) or temporary (e.g., bolted), direct or indirect (i.e., through an intermediary), mechanical, chemical, optical, or electrical.

DETAILED DESCRIPTION

Described is a system and method for using a Unmanned Aerial Vehicle (UAV) or other type of user equipment's (UE) location and wireless station locations as a factor in determining whether a wireless connection between a UE and a wireless station should be established and/or whether a handoff of a wireless connection between a UE and a first wireless station to a second wireless station should be initiated. A "wireless station," as used herein, refers to any form of receiver/transmitter location with which UE may establish or maintain a wireless communication. For example, a wireless station may include eNodeBs, base transceiver stations (BTS), etc.

As discussed below, in addition to considering a measured signal strength, measured in decibel milliwatts (dBm), for a wireless station and determining whether to establish a wireless connection and/or initiate a handoff based on the signal strength, the UE location and wireless station locations may likewise considered. For example, a first distance between the UE and a first wireless station and a second distance between the UE and a second wireless station may be determined and the measured signal strengths for one or both of the wireless stations adjusted based on the distances to prioritize or weight one wireless station with respect to another. After the signal strengths are adjusted, the adjusted signal strengths are utilized to determine to which wireless station the UE should connect and/or whether a handoff should be initiated.

In some implementations, a navigation path of the UE may be known and used as a factor in determining a wireless station for a wireless connection and/or for handoff consideration. For example, the navigation path of the UE may be considered to determine an approximate duration of time the UE will receive coverage by each wireless station that is at least at a minimum quality of service (QoS). A first wireless station that will provide coverage along the navigation path that is at least at a minimum QoS for a longest period of time may be prioritized over other wireless stations, even if the current signal strength from the first wireless station is not the strongest. For example, if a handoff is UE controlled, the UE may initiate a handoff of the wireless connection from a current wireless station to the first wireless station. If the handoff is UE supported, the UE may alter one or more of the signal strengths for the wireless stations that are reported by the UE to the wireless network provider so that the first wireless station is selected by the network. In other implementations, the fields reported by the UE to the wireless network provider may be increased such that the UE may be capable of reporting navigation path information, current position, etc.

The navigation path may be, for example, a navigation path from a source location to a destination location that is entered by a user of the UE into the UE, an application running on the UE or another computing device in communication with the UE. For example, if the UE is a user's cellular phone, or other client device, the user may request and obtain navigation instructions via a mapping and/or navigation application operating on the user's cellular phone. Those navigation instructions may be utilized as the navigation path, as described in the present disclosure. In another example, if the UE is a user's cellular phone that is connected (e.g., via Bluetooth, Near Field Communication (NFC)) to a computing system of the user's automobile and the user has requested and obtained navigation instructions via a navigation system included in or operated by the computing system of the automobile, the navigation instructions may be utilized as the navigation path, as described in the present disclosure. In still another example, if the UE is incorporated into a vehicle, such as an aerial vehicle, an unmanned aerial vehicle (UAV), a ground based vehicle, an unmanned ground based vehicle, a water based vehicle, or an unmanned water based vehicle, the navigation path may be a navigation path that is to be navigated by the vehicle.

In some implementations, if a navigation path is not known, a UE trajectory and/or anticipated navigation path may be determined for the UE and utilized as a factor in selecting a wireless station for a wireless connection and/or for handoff consideration. For example, the current path of the UE may be determined (e.g., where the cellular phone was located or the path navigated during the past several minutes). The determined current path can then be used to determine an anticipated trajectory of the UE, assuming it will continue along a path that is consistent with the current path. In some implementations, the current path for the UE may be aggregated over a period of time to determine routes that are frequently navigated by the UE. For example, if the UE is a user's cellular telephone and the user carries the phone with them to work on a daily basis, it may be determined that the UE (cellular telephone) traverses the same or similar path at a particular time of day as the user commutes to work. Such information may be aggregated and stored by a management system. The determined path history for the UE may then be compared to the stored information and a determination made as to whether the UE is likely navigating the path represented by the stored information (e.g., navigating the path to the user's work place). If it is determined that the UE is likely following a known route, that route may be used as an anticipated navigation path for the UE and considered as a factor in selecting a wireless station for a wireless connection and/or handoff consideration.

By considering UE location, wireless station locations, and/or a navigation path for the UE as a factor in selecting a wireless station for establishing a wireless connection and/or handoff consideration, the number of handoffs that may occur for the UE may be reduced, the overall QoS for the UE may be increased, and the overall load on the cellular network may be reduced because the amount of handoffs is reduced. Likewise, for aerial vehicles, such as UAVs, it may be desirable to select a wireless station that is a farther distance away because it provides an overall better QoS at a higher altitude, and for a longer period of time, than other wireless stations that may currently be presenting a stronger signal strength.

FIG. 1 is a diagram illustrating an environment utilizing UE 100 locations as a factor in establishing cellular connections and/or initiating handoffs, according to an implementation. As illustrated, a plurality of wireless stations 104 that are operated and controlled by a wireless network provider 106 provide a cellular network 102. The cellular network 102 may be utilized by UEs 100 to facilitate wireless communications, such as voice and/or data communications by establishing a wireless communication channel (also referred to herein as a wireless connection) between a UE and a wireless station. The cellular network 102 may utilize any number of cellular technologies, including, but limited to, Global System for Mobile Communications (GSM), General Packet Radio Service (GPRS), cdmaOne, CDMA2000, Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/TDMA), Integrated Digital Enhanced Network (iDEN), Personal Communication Service (PCS), Digital Advanced Mobile Phone Service (D-AMPS), second generation of mobile telecommunication technology (2G), third generation of mobile telecommunication technology (3G), fourth generation of mobile telecommunication technology (4G), Long-Term Evolution (LTE), etc.

Regardless of the technology utilized, the cellular network 102 includes a plurality of wireless stations 104 distributed about the cellular network 102 to provide wireless coverage to UEs 100 within the cellular network 102 coverage area. In traditional systems, a connection between a user equipment 100 and a wireless station is determined based on a signal strength for the wireless station, as measured at the UE. For example, UE 100(1), in a traditional system, will connect to wireless station 104(3) because the UE 100(1) is measuring, at the time of connection establishment, a stronger signal strength for wireless station 104(3) than the other surrounding wireless stations 104(1), 104(9), 104(10), 104(2), 104(4), 104(6). Likewise, as the UE 100(1) navigates the navigation path 101(1), in a traditional system, the wireless connection with the UE 100(1) will handoff from wireless station 104(3) to wireless station 104(1), then from wireless station 104(1) to wireless station 104(4) and then from wireless station 104(4) to wireless station 104(6), based on the signal strength values of the wireless stations as measured by the UE 100(1).

In comparison, utilizing the described implementations, the location of the wireless stations 104 and the location of the UE 100 will be considered when establishing a connection and/or when selecting a wireless station to which a handoff of an existing connection is to be initiated. For example, UE 100(1) will determine the location of wireless stations for which it is measuring a signal strength value that is above a minimum signal strength value, which is representative of a minimum required QoS. The location of wireless stations may be obtained from a management system 126 (discussed below), maintained in a memory of the UE 100(1), provided by the wireless stations, etc.

The management system 126 may operate on one or more remote computing resources 110 and provide information, such as wireless station location information to the UEs and/or receive signal strength values and UE position information. The remote computing resources 110 may form a portion of a network-accessible computing platform implemented as a computing infrastructure of processors, storage, software, data access, and other components that is maintained and accessible via a network. As illustrated, the remote computing resources 110 may include one or more servers, such as servers 120(1), 120(2) . . . 120(N). These servers 120(1)-(N) may be arranged in any number of ways, such as server farms, stacks, and the like that are commonly used in data centers. Furthermore, the servers 120(1)-(N) may include one or more processors 122 and memory 124 that may store a management system 126 that is used to provide wireless station information (e.g., location, coverage) to the UEs 100, receive information (e.g., signal strength values, position information, navigation paths) from the UE, and store and aggregate the received information.

The UE 100(1) also determines a location of the UE 100(1). For example, the UE 100(1) may include or be in communication with a global positioning satellite (GPS) receiver that receives position information (latitude, longitude) indicating a horizontal position of the UE. Likewise, in some implementations, the UE may include or be in communication with an altimeter that provides vertical position information (altitude) for the UE 100(1). Based on the determined wireless stations position information and the UE position information, the UE determines a distance between the UE 100(1) and each wireless station 104. The determined distances are then used as a factor in selecting a wireless station with which a wireless connection is to be established and/or as a factor for selecting a wireless station for a handoff of an existing wireless connection. In one implementation, the signal strengths measured by the UE 100(1) may be weighted or adjusted based on the determined distances prior to selecting a wireless station based on the signal strength values. In one example, the signal strength value for the wireless station that is the closest distance to the UE 100(1) will be increased by 5 dB, the signal strength value for the wireless station that is the second closest to the UE 100(1) will be increased by 3 dB, and the signal strength value for the wireless station that is the third closest to the UE 100(1) will be increased by 1 dB. In other implementations, other adjustments may be made to one or more of the signal strength values.

In some implementations, in addition to or as an alternative to considering the location of the UE, the navigation path of the UE may be determined and used as a factor in selecting a wireless station. For example, the navigation path for the UE 100(1), which is a UAV, is the navigation plan or navigation path for the UAV. In this example, the navigation path 101(1) is the planned navigation path for the UAV 100(1). While not illustrated in FIG. 1, the navigation path 101(1) for the UAV 100(1) also specifies that the UAV is to travel at an altitude of approximately 100 feet above sea level.

As discussed above, at the current position of the UE 100(1), the strongest signal strength value is from wireless station 104(3). However, because it is know from the navigation path that the UE 100(1) is traveling away from wireless station 104(3) and toward wireless station 104(6), and the signal strength value of wireless station 104(6) exceeds the minimum signal strength value, wireless station 104(6) is preferred over wireless station 104(3). Accordingly, wireless station 104(6) is selected for connection or handoff. For example, the signal strength value for wireless station 104(6) may be adjusted and/or the signal strength values of one or more other wireless stations may be adjusted. In some implementations, if the handoff is UE controlled, the UE may initiate a handoff to the wireless station 104(6). If the handoff is UE supported, the UE 100(1) may adjust the signal strength values that are reported to the wireless network provider 106 and/or remove one or more of the wireless stations from the reporting. In other implementations, the fields reported by the UE to the wireless network provider may be increased such that the UE may be capable of reporting navigation path information, current position, etc.

As another example, the navigation path for UE 100(2), which is an automobile, is not known. However, a path history may be maintained for the UE 100(2) based on past movements of the UE 100(2) that are stored and aggregated by the management system 126. For example, the automobile and/or a client device (e.g., cellular telephone) in the automobile 100(2) may include and/or be in communication with a GPS receiver and the GPS receiver may track navigation of the UE 100(2). The tracked navigation, time of day, speed, etc. may be provided by the UE 100(2) to the management system 126. As the UE 100(2) moves over a period of time, the movements of the UE are stored by the management system 126 and can be used to identify recurring navigation paths for the UE 100(2). For example, it may be determined that the UE 100(2) navigates from a start location 108 to a destination location 111 between approximately 08:00 hours and 08:30 hours every Monday, Tuesday, Wednesday, Thursday, and Friday. Other navigation paths may also be determined.

As the UE 100(2) navigates, the current path navigated by the UE 100(2) is provided to the management system 126 and the management system 126 compares the current path with the stored path history for UE 100(2) to determine if the UE is potentially navigating along one of the recurring navigation paths that have been determined for the UE 100(2). In this example, because the current path of UE 100(2) corresponds to a recurring navigation path for the UE 100(2), an anticipated navigation path 101(2) is determined and used as a factor in selecting wireless station for establishing a wireless connection and/or for a handoff consideration of an existing wireless connection.

Because the anticipated navigation path 101(2) indicates that the UE 100(2) will likely navigate to the destination location 111 along the navigation path 101(2) wireless station 104(2) will be determined to be a preferred wireless station for UE 100(2). Specifically, wireless station 104(2) will be determined to be the preferred wireless station because UE 100(2) will be within the coverage area of wireless station 104(2) for a longest duration of time.

For example, the coverage areas of wireless station 104(2), 104(3), and 104(7) may be determined based on data collected for the cellular network (discussed below). Based on the locations of the wireless stations, the anticipated navigation path 101(2) and the known coverage areas of the wireless stations, it is determined that the UE 100(2) will be within the coverage area of wireless station 104(2) for a longer period of time than it will be in the coverage area of wireless station 104(3) or wireless station 104(7).

Turning now to UE 100(3), which is a cellular telephone, in this example, the navigation path of the UE 100(3) is not known and a recurring navigation path cannot be determined for the UE. Accordingly, based on the current path 101(5) of the UE 100(3), a trajectory for the UE 100(3) may be determined. Specifically, in this example, because the UE 100(3) has been moving in a linear direction 101(5) at an approximately steady speed, a trajectory is determined, anticipating that the UE 100(3) will continue along that navigation path. Based on the trajectory, an anticipated navigation path 101(3) is determined Similar to the other examples, the location of the UE 100(3) and/or the anticipated navigation path 101(3) of the wireless station may be utilized in addition to the measured signal strength values for the wireless stations in selecting a wireless station for establishing a wireless connection or to which a handoff is to be initiated.

Figure 2:
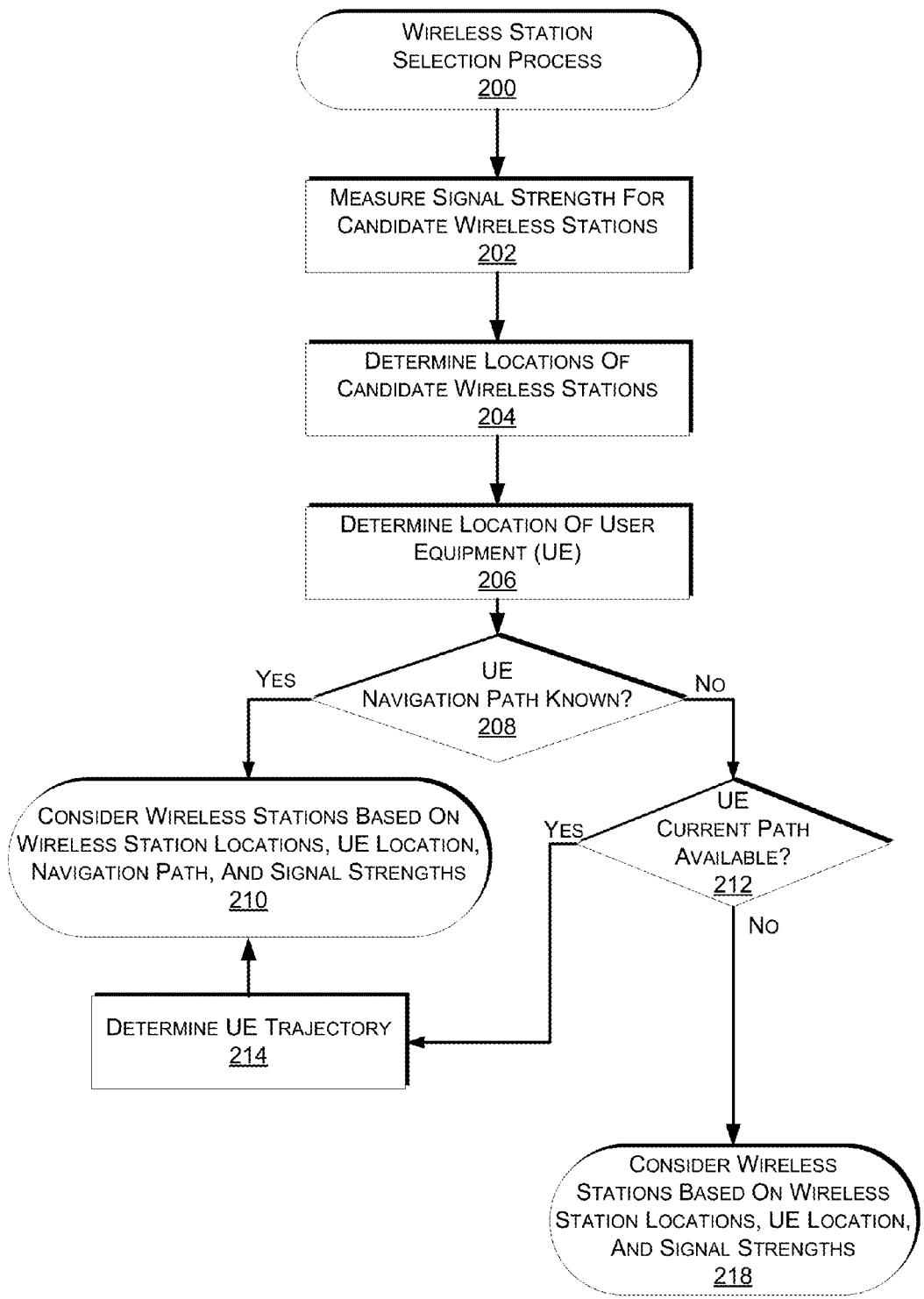
FIG. 2 is a flow diagram illustrating an example Evolved Node B selection process, according to an implementation.

FIG. 2 is a flow diagram illustrating an example wireless station selection process 200, according to an implementation. The example process of FIG. 2 and each of the other processes discussed herein may be implemented in hardware, software, or a combination thereof. In the context of software, the described operations represent computer-executable instructions stored on one or more computer-readable media that, when executed by one or more processors, perform the recited operations. Generally, computer-executable instructions include routines, programs, objects, components, data structures, and the like that perform particular functions or implement particular abstract data types.

The computer-readable media may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations, the computer-readable media may include a transitory computer-readable signal (in compressed or uncompressed form). Examples of computer-readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the process.

The example process 200 begins when the UE measures the signal strength values of candidate wireless stations, as in 202. In addition, the location of each candidate wireless station is determined, as in 204. For example, as data is collected over a period of time by various UEs and reported to the management system, the management system may aggregate that data and determine approximate wireless station locations based on the signal strength values collected from those wireless stations. As another example, the wireless station locations may be provided by the wireless network provider. In still another example, the wireless station locations may be received by the UE directly from the wireless stations.

The location of the UE is also determined, as in 206. The location may be determined, for example, based on position information received by a GPS receiver of the UE and/or from a GPS receiver that is in communication with the UE. A determination is also made as to whether the navigation path for the UE is also known, as in 208. As discussed above, the navigation path for a UE may be known based on a variety of inputs. For example, the UE may be assigned a specific navigation path that is to be navigated by the UE. In one example, the UE may be included in a UAV and the UAV may be assigned a navigation path that is to be navigated by the UAV as part of an order delivery process. In another example, the navigation path may be determined from the UE or an application executing the UE that has determined directions (navigation path) between a start location and a destination location. In still another example, the UE may be in communication with a navigation system operated by or on another computing system. For example, the UE may be a cellular telephone that is communicating with a computing system of a vehicle that includes a navigation system that has determined or received a navigation path that the vehicle will navigate. In such an example, the navigation path of the vehicle is the navigation path of the UE.

If it is determined that the navigation path of the UE is known, the candidate wireless stations are considered based on the determined wireless station locations, the determined UE location, the navigation path, and the signal strength values for each candidate wireless station, as in 210. For example, the example process 200 may determine the distances between the UE and each candidate wireless station, determine a coverage area of each wireless station and determine that the UE will be located in the coverage area of one of the wireless stations for a longer period of time and/or that a larger portion of the UE navigation path is in the coverage area of one of the wireless stations. Based on the considerations, a wireless connection between the UE and a candidate wireless station may be established or, if a wireless connection already exists, a wireless station to which the wireless connection is to be transferred via a handoff is determined.

If it is determined that the navigation path of the UE is not known, a determination may be made as to whether a current path of the UE is available, as in 212. The current path may be the path traveled during an immediately preceding period of time (e.g., last two minutes) by the UE, a defined distance, etc. For example, a GPS receiver of the UE may collect position information for the UE and maintain that position information for a period of time. The maintained position information may be utilized as the current path for the UE. If it is determined that the current path of the UE is available, a trajectory may be determined for the UE, as in 214. For example, if the current path of the UE is in a particular direction, at a particular speed, and/or at a particular altitude, it may be anticipated that the navigation path will continue in that direction, at that approximate speed and/or at that approximate altitude. The anticipated trajectory is then used as the navigation path for the UE.

The candidate wireless stations are then considered based on the determined wireless station locations, the determined UE location, the navigation path, and the signal strength values for each candidate wireless station, as in 210. In some implementations, the current path and/or anticipated trajectory may be compared with stored path history that has been determined for the UE to anticipate the trajectory or anticipate a navigation path for the UE. For example, as the UE navigates within the cellular network, navigation information (e.g., position, time, altitude) for the UE may be provided to and stored by the management system. The management system may aggregate that navigation information to determine navigation paths that are followed by the UE on a recurring basis (e.g., navigation path to work, navigation path to store). In such an example, the current path of the UE may be compared with the stored path history for the UE to determine if the UE is potentially following one of the stored path histories for the UE that the UE navigates on a recurring basis. If a path history is determined, it may be used as the navigation path for considering wireless stations for a wireless network connection with the UE or as part of the factors for selecting a wireless station to which to handoff an existing wireless connection.

Returning to decision block 212, if it is determined that the current path is not available, the candidate wireless stations are considered based on the determined wireless station locations, the determined UE location, and the signal strength values for each candidate wireless station, as in 218. For example, the signal strength values for each wireless station may be adjusted based on the wireless station locations and the UE location. In one implementation, the signal strength value for the wireless station that is closest to the UE is increased by a first defined amount (e.g., 5 dB), the signal strength value for the second closest wireless station is increased by a second defined amount (e.g., 3 dB), etc. The adjusted signal strength values may then be considered in determining which wireless station should be selected for establishing a wireless connection with the UE. Alternatively, if a wireless connection is already established, the adjusted signal strength values may be considered in selecting a wireless station to which the wireless connection is to be transferred via a handoff. In implementations in which a wireless connection or a handoff is UE supported, the UE may send the adjusted signal strength values to the wireless network provider so that the desired wireless station will be selected by the wireless network provider based on the adjusted signal strength value(s). Alternatively, or in addition thereto, the UE may not report the signal strength values for all of the candidate wireless stations, thereby reducing the choices of wireless station selection for the UE. In other implementations, the fields reported by the UE to the wireless network provider may be increased such that the UE may be capable of reporting navigation path information, current position, etc.

Figure 3:
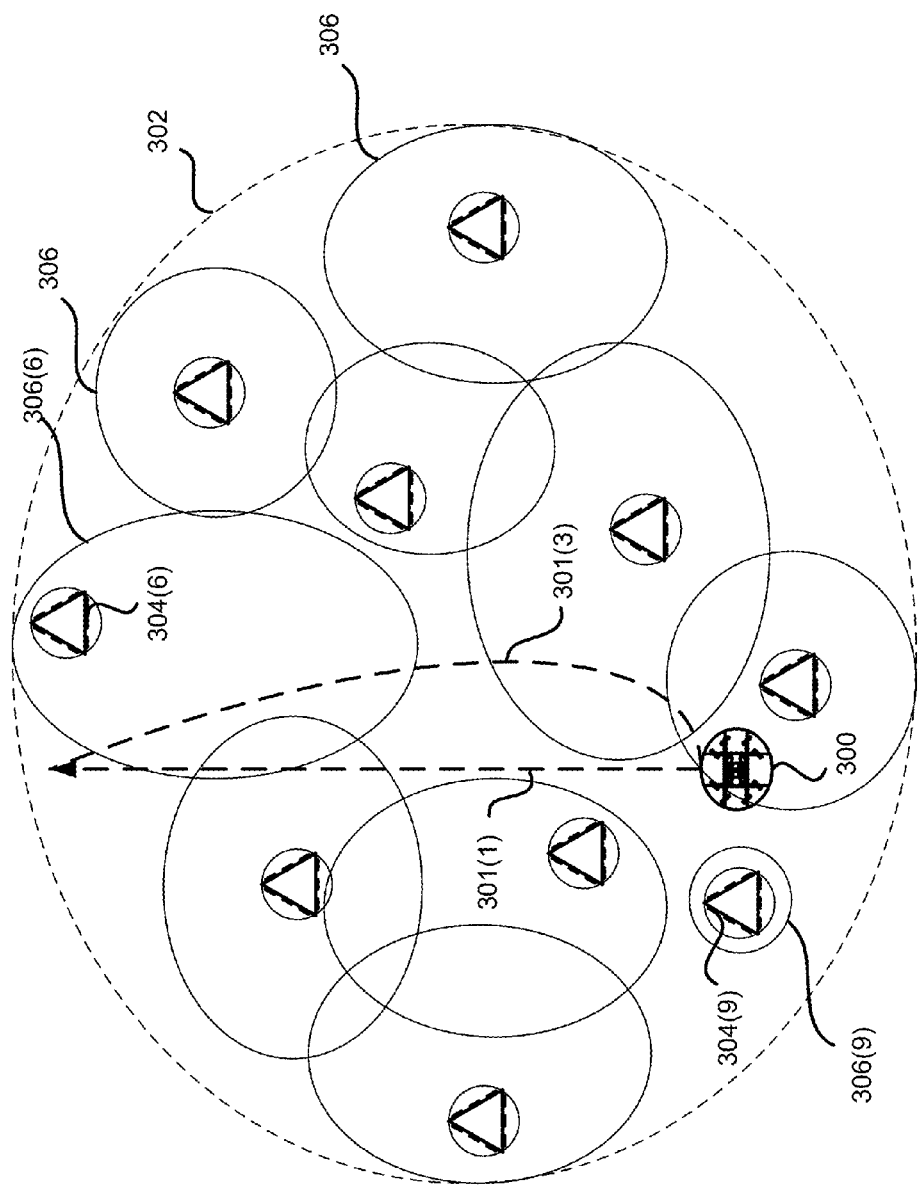
FIG. 3 is a diagram of an Evolved Node B coverage area from a perspective of a UAV operating at an altitude of approximately 100 feet, according to an implementation.

FIG. 3 is a diagram of a determined wireless station coverage area for wireless stations within a cellular network 302, according to an implementation. In this example, the determined wireless station coverage area is from the perspective of a UAV operating at approximately 100 feet of altitude above sea level. Because the cellular network 302 is generally designed to provide cellular coverage for users located on the ground or in buildings, the antennas of wireless stations 304 are often oriented in a downward direction so that the coverage area 306 of the wireless stations is optimized for the location of those users. Because of this design constraint, the wireless station coverage areas from an altitude of approximately 100 feet may be different than that experienced from UEs on the ground. Specifically, some wireless stations, such as wireless station 304(6) may provide a larger coverage area 306(6) because obstacles (e.g., buildings, trees) that typically block the wireless transmission from the wireless station 304(6) from the perspective of UEs on the ground, are not interfering with the wireless transmissions from/to the wireless station 304 (6) at 100 feet of altitude. In comparison, the wireless coverage area 306(9) of other wireless stations, such as wireless station 304(9) may appear small because the main lobe of the antennas is directed downward. Because of the altered perspective of the cellular network at a higher altitude, the coverage area may include coverage gaps between wireless stations and/or directly above a wireless station, some wireless stations may provide coverage to a larger area, and/or some wireless stations may provide coverage to a smaller area.

The coverage areas for wireless stations 304 within a cellular network 302 may be determined by collecting an aggregating signal strength values for the wireless stations as measured by UAVs as they navigate within the cellular network 302. Based on the aggregated data, wireless station coverage areas 306 can be determined at different altitudes. Preferred navigation routes may also be determined based on the determined coverage area. For example, rather than a UAV 300 navigating at approximately 100 feet directly north, as illustrated by navigation path 301(1), which results in the UAV not receiving cellular coverage during a large portion of the navigation, it may be determined that the UAV 300 should follow navigation path 301(3), which remains within the cellular coverage of wireless stations for a larger portion of the navigation path. In other implementations, it may be determined that the UAV should alter its altitude to receive coverage along different portions of a navigation path. For example, rather than, or in addition to altering its navigation path from navigation path 301(1) to navigation path 301(3) at approximately 100 feet of altitude, it may be determined that the UAV 300 should navigate a portion of the navigation path 301(1) at a lower altitude (e.g., 50 feet) in order to obtain cellular coverage.

Figure 4:
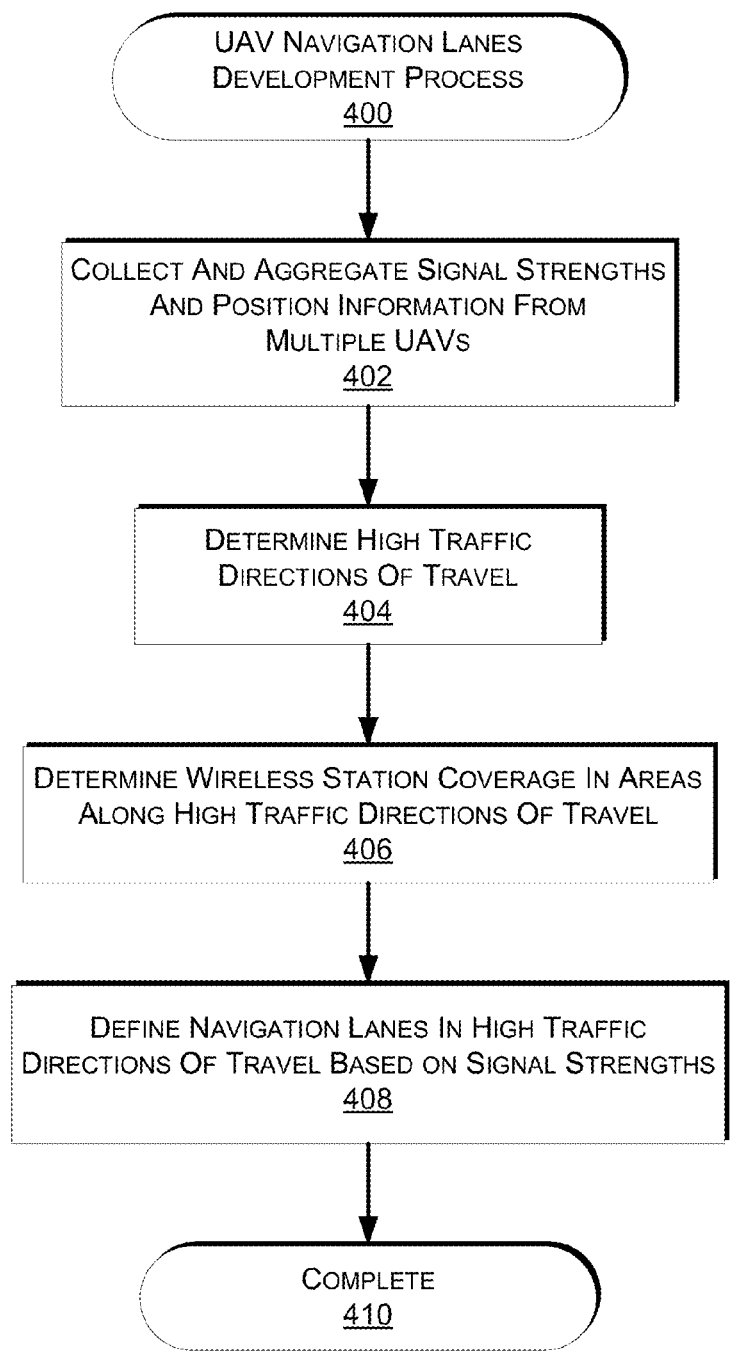
FIG. 4 is a flow diagram illustrating an example unmanned aerial vehicle navigation lanes development process, according to an implementation.

FIG. 4 is an example UAV navigation lanes development process 400, according to an implementation. The example process 400 begins by collecting and aggregating over a period of time, signal strength values for wireless stations within a cellular network and position information for UAVs, as in 402. Based on the collected position information, high traffic directions of travel are determined for the UAVs, as in 404. For example, it may be determined from the collected position information that a majority of the UAVs aerially navigate from a source (e.g., materials handling facility) in a northeast direction toward a metropolitan area.

In some implementations, other aerial vehicles may be used in addition to or as alternative to UAVs to collect signal strength measurements for wireless stations within the cellular network. For example, specialized UAVs designed for measuring signal strength values, helicopters, and/or other aerial vehicles may be utilized to collect signal strength values for wireless stations within a cellular network.

For the determined high traffic directions of travel, wireless station coverage areas may be determined based on the collected and aggregated wireless station signal strength values, as in 406, and as discussed above with respect to FIG. 3. In some implementations, if signal strength values for an area have not been collected, the coverage may be inferred for an area based on collected signal strength values for a coverage area having a similar topology and positions of wireless stations.

Based on the determined high traffic directions of travel and the coverage areas, navigation lanes may be defined in the high traffic directions of travel, as in 408. For example, if it is determined that UAVs generally travel in a north-east direction, a navigation lane that is to be followed in that north-east direction is determined that will keep the UAVs within coverage areas of the cellular network. The navigation lane is an area of travel and may vary in altitude and/or direction based on the wireless station coverage areas along the high traffic direction of travel. When a navigation lane is established, UAVs navigating in that direction may navigate within the navigation lane and obtain cellular coverage from the cellular network. The example process then completes, as in 410.

Figure 5:
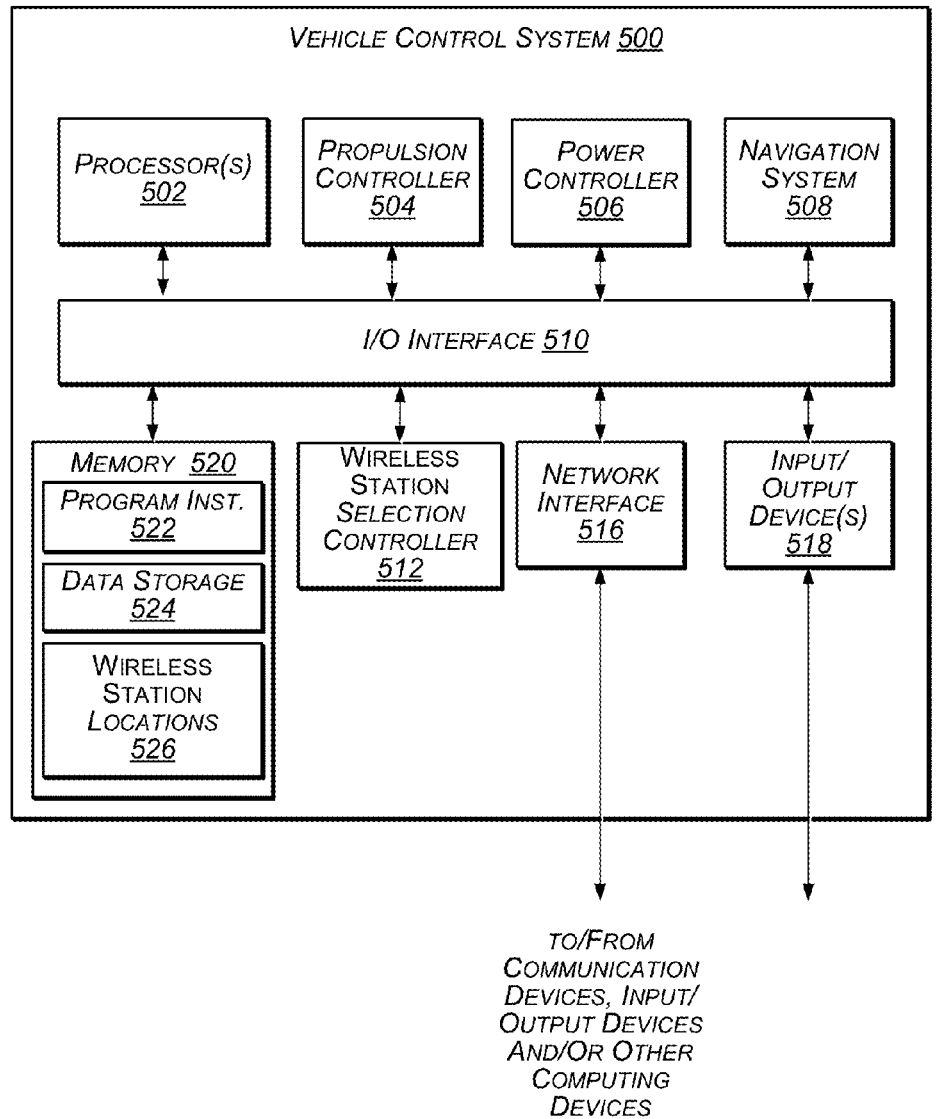
FIG. 5 depicts a block diagram illustrating various components of a vehicle control system, according to an implementation.

FIG. 5 is a block diagram illustrating an example vehicle control system 500, which may be utilized by a vehicle, such as a UAV. In the illustrated implementation, the vehicle control system 500 includes one or more processors 502 coupled to a non-transitory computer readable storage medium 520 via an input/output (I/O) interface 510. The vehicle control system 500 may also include a propulsion controller 504 (e.g., for controlling one or more motors, engines, etc.), a power controller 506, and/or a navigation system 508. The vehicle control system 500 further includes a network interface 516, one or more input/output devices 518, and a wireless station selection controller 512.

In various implementations, the vehicle control system 500 may be a uniprocessor system including one processor 502, or a multiprocessor system including several processors 502 (e.g., two, four, eight, or another suitable number). The processor(s) 502 may be any suitable processor capable of executing instructions. For example, in various implementations, the processor(s) 502 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 502 may commonly, but not necessarily, implement the same ISA.

The non-transitory computer readable storage medium 520 may be configured to store executable instructions, data, navigation paths, wireless station location information, and/or data items accessible by the processor(s) 502. In various implementations, the non-transitory computer readable storage medium 520 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions, such as those described herein, are shown stored within the non-transitory computer readable storage medium 520 as program instructions 522, data storage 524 and wireless station locations 526, respectively. In other implementations, program instructions, data, and/or antenna orientation may be received, sent, or stored upon different types of computer-accessible media, such as non-transitory media, or on similar media separate from the non-transitory computer readable storage medium 520 or the vehicle control system 500. Generally speaking, a non-transitory, computer readable storage medium may include storage media or memory media such as magnetic or optical media, e.g., disk or CD/DVD-ROM, coupled to the vehicle control system 500 via the I/O interface 510. Program instructions and data stored via a non-transitory computer readable storage medium may be transmitted by transmission media or signals such as electrical, electromagnetic, or digital signals, which may be conveyed via a communication medium such as a network and/or a wireless link, such as may be implemented via the network interface 516.

In one implementation, the I/O interface 510 may be configured to coordinate I/O traffic between the processor(s) 502, the non-transitory computer readable storage medium 520, and any peripheral devices, the network interface or other peripheral interfaces, such as input/output devices 518. In some implementations, the I/O interface 510 may perform any necessary protocol, timing or other data transformations to convert data signals from one component (e.g., non-transitory computer readable storage medium 520) into a format suitable for use by another component (e.g., processor(s) 502). In some implementations, the I/O interface 510 may include support for devices attached through various types of peripheral buses, such as a variant of the Peripheral Component Interconnect (PCI) bus standard or the Universal Serial Bus (USB) standard, for example. In some implementations, the function of the I/O interface 510 may be split into two or more separate components, such as a north bridge and a south bridge, for example. Additionally, in some implementations, some or all of the functionality of the I/O interface 510, such as an interface to the non-transitory computer readable storage medium 520, may be incorporated directly into the processor(s) 502.

The propulsion controller 504 communicates with the navigation system 508 (e.g., for adjusting the power of each motor of the vehicle, such as a propeller motor of a UAV, to guide the vehicle along a navigation path). The navigation system 508 may include a GPS receiver, indoor positioning system (IPS), or other similar system and/or sensors that can be used to navigate the vehicle to and/or from a location. The wireless station selection controller 512 communicates with the navigation system 508 to obtain position information that is used to determine the location and/or altitude of the UAV. Likewise, the wireless station selection controller also communicates with the memory 520 to obtain wireless station locations 526 and determine a preferred wireless station for a wireless connection and/or for a handoff of an existing wireless connection.

The network interface 516 may be configured to allow data to be exchanged between the vehicle control system 500, other devices attached to a network, such as other computer systems (e.g., remote computing resources 210), and/or with vehicle control systems of other vehicles. For example, the network interface 516 may enable wireless connection between the vehicle and a wireless station of a cellular network. As another example, the network interface 516 may enable wireless connection between numerous vehicles. In various implementations, the network interface 516 may support communication via wireless general data networks, such as a Wi-Fi network. For example, the network interface 516 may support communication via telecommunications networks such as cellular communication networks, satellite networks, and the like.

In some implementations, input/output devices 518 may include one or more displays, imaging devices, thermal sensors, infrared sensors, time of flight sensors, accelerometers, pressure sensors, altimeters, weather sensors, etc. Multiple input/output devices 518 may be present and controlled by the vehicle control system 500. One or more of these sensors may be utilized to assist in the landing, the avoidance of obstacles during flight, and/or aerial navigation.

As shown in FIG. 5, the memory may include program instructions 522 that may be configured to implement the example processes described herein. The data storage 524 may include various data stores for maintaining data items, such as wireless station locations. In various implementations, the parameter values and other data illustrated herein as being included in one or more data stores may be combined with other information not described or may be partitioned differently into more, fewer, or different data structures. In some implementations, data stores may be physically located in one memory or may be distributed among two or more memories.

Those skilled in the art will appreciate that the vehicle control system 500 is merely illustrative and is not intended to limit the scope of the present disclosure. In particular, the computing system and devices may include any combination of hardware or software that can perform the indicated functions, including computers, network devices, internet appliances, PDAs, wireless phones, pagers, etc. The vehicle control system 500 may also be connected to other devices that are not illustrated, or instead may operate as a stand-alone system. In addition, the functionality provided by the illustrated components may in some implementations be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated vehicle control system 500. Some or all of the system components or data structures may also be stored (e.g., as instructions or structured data) on a non-transitory, computer-accessible medium or a portable article to be read by an appropriate drive, various examples of which are described herein. In some implementations, instructions stored on a computer-accessible storage medium separate from the vehicle control system 500 may be transmitted to the vehicle control system 500 via transmission media or signals such as electrical, electromagnetic, or digital signals, conveyed via a communication medium such as a wireless link. Various implementations may further include receiving, sending, or storing instructions and/or data implemented in accordance with the foregoing description upon a computer-accessible medium. Accordingly, the techniques described herein may be practiced with other vehicle control system configurations.

Those skilled in the art will appreciate that, in some implementations, the functionality provided by the processes and systems discussed above may be provided in alternative ways, such as being split among more software modules or routines or consolidated into fewer modules or routines. Similarly, in some implementations, illustrated processes and systems may provide more or less functionality than is described, such as when other illustrated processes instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that, in other implementations, the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some implementations, illustrated data structures may store more or less information than is described, such as when other illustrated data structures instead lack or include such information respectively, or when the amount or types of information that is stored is altered. The various methods and systems as illustrated in the figures and described herein represent example implementations. The methods and systems may be implemented in software, hardware, or a combination thereof in other implementations. Similarly, the order of any method may be changed and various elements may be added, reordered, combined, omitted, modified, etc., in other implementations.

From the foregoing, it will be appreciated that, although specific implementations have been described herein for purposes of illustration, various modifications may be made without deviating from the spirit and scope of the appended claims and the elements recited therein. In addition, while certain aspects are presented below in certain claim forms, the inventors contemplate the various aspects in any available claim form. For example, while only some aspects may currently be recited as being embodied in a computer readable storage medium, other aspects may likewise be so embodied. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A non-transitory computer-readable media storing computer-executable instructions that, when executed on one or more processors, cause the one or more processors to perform acts comprising:
   measuring at a user equipment (UE) a first signal strength for a first wireless station;
   measuring at the UE, a second signal strength for a second wireless station, wherein the first signal strength is stronger than the second signal strength;
   receiving at the UE, a first wireless station location of the first wireless station;
   receiving at the UE, a second wireless station location of the second wireless station;
   receiving at the UE, a UE location of the UE;
   determining at the UE, based at least in part on the UE location, the first wireless station location, the second wireless station location, the first signal strength, and the second signal strength, that a wireless communication between the UE and the second wireless station is to be established;
   determining, at the UE, a navigation path of the UE;
   initiating a wireless communication establishment between the second wireless station and the UE; and
   wherein determining that the wireless communication is to be established between the UE and the second wireless station is to be established, is further based at least in part on the navigation path of the UE.

2. The non-transitory computer-readable media of claim 1, the acts further comprising:
   transmitting to a wireless network provider at least one of the first signal strength, the second signal strength, the first wireless station location, the second wireless station location, or UE location.

3. The non-transitory computer-readable media of claim 1, wherein determining that the wireless communication between the UE and the second wireless station is to be established, further includes:
   determining that the first wireless station provides wireless coverage for a first portion of the navigation path at least at a minimum quality of service;
   determining that the second wireless station provides wireless coverage for a second portion of the navigation path at least at the minimum quality of service; and
   determining that UE will be located in the second portion of the navigation path for a longer period of time than the first portion of the navigation path.

4. The non-transitory computer-readable media of claim 1, the acts further comprising:
   determining a current UE path indicating a path that has already been traversed by the UE;
   determining, based at least in part on the current UE path, a UE trajectory indicating an anticipated trajectory of the UE; and
   wherein determining that the wireless communication between the UE and the second wireless station is to be established, is further based at least in part on the UE trajectory.

5. The non-transitory computer-readable media of claim 4, wherein determining that the wireless communication between the UE and the second wireless station is to be established, further includes:
   determining that the first wireless station provides wireless coverage for a first portion of the UE trajectory at least at a minimum quality of service;

determining that the second wireless station provides wireless coverage for a second portion of the UE trajectory at least at the minimum quality of service; and determining that second portion is larger than the first portion.

6. The non-transitory computer-readable media of claim 4, the acts further comprising:

determining an anticipated navigation path of the UE based on a stored path history that corresponds with current path of the UE, wherein the stored path history is representative of a recurring navigation path that is navigated by the UE on a recurring basis; and wherein determining that the wireless communication between the UE and the second wireless station is to be established, further includes:

determining that the first wireless station provides wireless coverage for a first portion of the anticipated navigation path at least at a minimum quality of service;

determining that the second wireless station provides wireless coverage for a second portion of the anticipated navigation path at least at the minimum quality of service; and determining that second portion is larger than the first portion.

7. The non-transitory computer-readable media of claim 4, the acts further comprising:

determining an anticipated navigation path of the UE based on a stored path history that corresponds with a current path of the UE, wherein the stored path history is representative of a recurring navigation path that is navigated by the UE on a recurring basis; and wherein determining that the wireless communication between the UE and the second wireless station is to be established, further includes:

determining that the first wireless station provides wireless coverage for a first portion of the anticipated navigation path at least at a minimum quality of service;

determining that the second wireless station provides wireless coverage for a second portion of the anticipated navigation path at least at the minimum quality of service; and determining that the UE will be positioned within the first portion for a longer period of time than the UE will be positioned in the second portion.

8. The non-transitory computer-readable media of claim 1, wherein:

establishing a wireless communication is part of a handoff from the first wireless station to the second wireless station; and initiating the handoff includes:

adjusting at least one of the first signal strength or the second signal strength; and transmitting to a wireless network provider the adjusted at least one first signal strength or the second signal strength.

9. The non-transitory computer-readable media of claim 1, the acts further comprising:

measuring at the UE, a third signal strength for a third wireless station, wherein the third signal strength is stronger than the second signal strength;

determining at the UE, a third wireless station location of the third wireless station; and wherein establishing a wireless connection between the UE and the second wireless station includes:

reporting to a wireless network provider the second signal strength without reporting the third signal strength.

10. A method, comprising:

measuring at a user equipment (UE) a first signal strength of a first wireless station, wherein a wireless communication is active between the UE and first wireless station;

measuring at the UE, a second signal strength of a second wireless station;

measuring at the UE, a third signal strength of a third wireless station, wherein the second signal strength is stronger than the third signal strength;

determining at the UE, a first wireless station location of the first wireless station;

determining at the UE, a second wireless station location of the second wireless station;

determining at the UE, a third wireless station location of the third wireless station;

determining at the UE, a UE location;

determining at the UE, based at least in part on the UE location, the first wireless station location, the second wireless station location, the third wireless station location, the first signal strength, the second signal strength, and the third signal strength, that a handoff of the wireless communication from the first wireless station to the third wireless station is to be initiated;

initiating the handoff of the wireless communication from the first wireless station to the third wireless station;

determining a navigation path of the UE; and wherein determining that the handoff of the wireless communication from the first wireless station to the third wireless station is to be initiated, is further based at least in part on the navigation path of the UE.

11. The method of claim 10, wherein:

the third wireless station location is a farther distance from the UE location than the second wireless station location.

12. The method of claim 10, wherein the third wireless station provides at least a minimum signal quality level along a longer portion of the navigation path that is provided by the second wireless station.

13. The method of claim 10, wherein the navigation path is a path from a source location to a destination location that has been determined at least in part by one or more of the UE, a first navigation application operating on the UE, or a second navigation application operating on a computing system in communication with the UE.

14. The method of claim 10, wherein determining that the handoff of the wireless communication from the first wireless station to the third wireless station is to be initiated, further includes:

determining that the third wireless station provides wireless coverage for a first portion of the navigation path at least at a minimum signal quality level;

determining that the second wireless station provides wireless coverage for a second portion of the navigation path at least at the minimum signal quality level; and determining that the first portion is larger than the second portion.

* * * * *